United States Patent [19]

Bheda et al.

[11] Patent Number: 6,090,877
[45] Date of Patent: Jul. 18, 2000

[54] PROPYLENE POLYMER COMPOSITIONS STABILIZED WITH POTASSIUM CITRATE AS AN ACID SCAVENGER

[75] Inventors: Mukesh C. Bheda, Cumming; Alvin Dorman, Marietta, both of Ga.

[73] Assignee: BP Amoco Corporation, Chicago, Ill.

[21] Appl. No.: 09/300,625

[22] Filed: Apr. 27, 1999

Related U.S. Application Data

[60] Provisional application No. 60/083,263, Apr. 27, 1998.

[51] Int. Cl.[7] .............................. C08K 5/098; C08K 5/092
[52] U.S. Cl. ............................................ 524/381; 521/400
[58] Field of Search ....................................... 524/381, 400

[56] References Cited

U.S. PATENT DOCUMENTS 4,649,171   3/1987   Bonnke et al. .......................... 524/381
5,063,264   11/1991  Nakajima ................................. 524/400

*Primary Examiner*—Peter A. Szekely
*Attorney, Agent, or Firm*—Wallace L. Oliver

[57] ABSTRACT

A low smoke forming, acid neutralized propylene polymer composition comprises a propylene polymer and an acid-scavenging amount of mono potassium citrate.

19 Claims, No Drawings

PROPYLENE POLYMER COMPOSITIONS STABILIZED WITH POTASSIUM CITRATE AS AN ACID SCAVENGER

CROSS-REFERENCE TO RELATED APPLICATIONS

This application claims benefit of U.S. Provisional Application No. 60/083,263, filed Apr. 27, 1998, which is incorporated by reference herein.

BACKGROUND OF THE INVENTION

This invention relates to propylene polymer compositions which contain an acid scavenger and more particularly relates to a propylene polymer composition containing mono potassium citrate as an acid scavenger.

Most practical uses of propylene polymer compositions require that the composition be stabilized with an acid scavenger. Typically, propylene polymers, which have been formed using catalysts containing halides, require some functionality of an acid scavenger to stabilize the polymer formulation against corrosivity for long term uses.

Many applications of propylene polymers, such as formation of spun bonded materials and molding applications including thermoforming, preferably require a resin which does not produce large amounts of smoke during processing, and more particularly, does not produce a build-up of wax-like material around the processing equipment. In many instances, this wax-like material originates from fatty acid derivatives contained in the polymer formulation. Thus it has been long known that typical acid neutralizers used in conventional polypropylene resins such a calcium stearate which contain long aliphatic chains, such as fatty acid salts, should be avoided. One alternative acid neutralizing additive used commercially, calcium lactate, does not produce as much smoke as calcium stearate, but has shown to exhibit screen pack pluggage during melt extrusion of the polymer. This limits production rates of polymer in a commercial facility and may add significant cost to production. Since calcium lactate melts above the temperature of polymer melt extrusion, its particle size is critical in filtering the propylene polymer blended with the additive. There is a need for a propylene polymer formulation which is sufficiently acid stabilized, does not produce excessive smoke or wax build-up during processing, does not cause excessive screen pack pluggage problems, and is compatible with other typically used polymer additives.

U.S. Pat. No. 4,649,171 shows polypropylene compositions containing trisodium and tripotassium citrates as anti-corrosion additives. However, due to the high melting points of these trimetal salts, these materials do not disperse well in the polymer composition and lead to filterability difficulties and high screen pack plugging.

U.S. Pat. No. 5,834,541, incorporated by reference herein, describes a polymer composition containing a non-fatty acid salt acid neutralizer in combination with specific phosphites together with certain hydroxylamines or a bezofuranone. Use of potassium citrate is not disclosed.

In one aspect of this invention, mono potassium citrate is incorporated into a propylene polymer composition to scavenge or neutralize excess acid. In other aspects of this invention, an additive package including mono potassium citrate as an acid scavenger together with other typical additive components are incorporated into a propylene polymer composition.

Further aspects of this invention include an acid stabilized propylene polymer composition which does not experience excessive screen pack plugging during the manufacturing process and which does not produce excess smoke or wax build-up around process equipment during processing.

Other aspects of the invention include formed articles produced using the compositions described in this invention and methods of producing those articles.

Still other aspects of this invention are apparent as described herein.

SUMMARY OF THE INVENTION

A low smoke forming, acid neutralized propylene polymer composition comprises a propylene polymer and an acid-scavenging amount of mono potassium citrate.

DESCRIPTION OF THE PREFERRED EMBODIMENT(S)

This invention is a combination of a propylene polymer and an acid scavenger material which produces a resin formulation which has low smoke and low wax build up during processing and minimizes screen pack plugging during manufacturing. The composition comprises a propylene polymer and an acid-scavenging amount of mono potassium citrate.

Effective amounts of the acid scavenger of this invention in a propylene polymer formulation typically range from about 50 to about 1000 ppm, preferably range from about 100 to about 700 ppm, and most typically range from about 200 to 300 ppm, based on the propylene polymer. The acid scavenger must be effective to inhibit corrosion of steel in contact with a plaque of polymer under standard conditions of temperature, humidity, and time. In a standard test, a resin, either in pellet or powder form is compression molded against a mild steel coupon at 260° C. for fifteen minutes. After cooling, the coupons are removed from the polymer and aged in a closed humidity chamber (85% humidity at 42° C.) for four hours. The coupons are examined for signs of pitting and discoloration which are indications of corrosion. The coupons are rated for severity of corrosion as none, light, moderate or severe.

Propylene polymers useful in this invention include isotactic polypropylene, random propylene/ethylene copolymer containing up to 10 wt. % ethylene, and impact propylene copolymers containing up to 20 wt. % ethylene or other alpha-olefin.

Minor amount of other polymer additives such as antioxidants, stabilizers, and the like also may be included in the composition of this invention. Typically, these other additives are incorporated at levels of about 25 to 2000 ppm and typically range from abut 50 to about 1000 ppm, typically 400 to 1000 ppm, based on the polymer.

Peroxide compounds may be added for controlled rheology to increase the melt flow rate (MFR) of the formulated resin. Peroxide acts to break long polymer chains and has the effect of both increasing MFR and narrowing the molecular weight distribution (Mw/Mn) or polydispersity. A typical reactor polypropylene powder with an MFR of 2 g/10 min. (measured by ASTM 1238, Condition L) by controlled rheology treatment with peroxide in an extruder may form a polymer with an MFR of 20–40. By varying the type, amount of, and process conditions using, peroxide, the final polymer MFR may be controlled as known in the art.

An advantage observed in the formulations of this invention is that screen packs used to filter molten polymer during an extrusion process do not plug to the extent experienced using the conventional calcium lactate.

In another aspect of the invention, the acid-scavenged resin may be formulated with other compatible resin additives to produce commercially-acceptable resin compositions useful in various applications. Examples of such applications include use to form fibers, extruded films, tapes, spunbonded webs, molded or thermoformed products, and the like. Specific additive packages for each application may be selected as known in the art. Examples of supplemental additives include slip agents, anti-blocks, anti-stats, mold release agents, primary and secondary antioxidants, clarifiers, nucleants, uv stabilizers, and the like. Classes of additives are well known in the art and include phosphite antioxidants, hydroxylamine, (such as N,N-dialkyl hydroxylamines) and amine oxide (such as dialkyl methyl amine oxide) antioxidants, hindered amine light (uv) stabilizers, phenolic stabilizers, benzofuranone stabilizers, and the like. Various olefin polymer additives are described in U.S. Pat. Nos. 4,318,845, 4,325,863, 4,590,231, 4,668,721, 4,876,300, 5,175,312, 5,276,076, 5,326,802, 5,344,860, 5,596,033, and 5,625,090, all incorporated by reference herein.

Representative examples of phosphite anti-oxidants include:

Bis (2,4-di-t-butylphenyl) pentaerythritol diphosphite (Ultranox 626, GE Specialty Chemicals); tris (2,4-di-tert-butylphenyl) phosphite (Irgafos 168, Ciba); 2-[[2,4,8,10-tetrakis(1,1-dimethylethyl)dibenzo[d,f][1,3,2]dioxaphosphepin-6-yl]oxy]-N,N-bis[2-[[2,4,8,10-tetrakis(1,1-dimethylethyl)dibenzo[d,f][1,3,2]dioxaphosphepin-6-yl]oxy]-ethyl]ethanamine (Irgafos 12, Ciba), 2,4,6 tri-t-butylphenyl 2 butyl 2 ethyl 1,3 propane diphosphite (Ultranox 641, GE Specialty Chemicals); bis(2,4-dicumylphenyl) pentaerythritol diphosphite (Doverphos S-9228, Dover Chemical Corporation); bis(2,6-di-t-butyl-4-methylphenyl)pentaerythritol-di-phosphite (PEP-36, Amfine Chemical); reaction product of phosphorous trichloride with 1,1'-biphenyl and 2,4 bis (1,1'-dimethyl) phenol (Sandostab P-EPQ, Clariant), 2,4,6 tri-t-butylphenyl 2 butyl 2 ethyl 1,3 propane diphosphite (Ultranox 641, GE Specialty Chemicals); distearyl pentaerythritol diphosphite (Weston 619, GE Specialty Chemicals).

Representative examples of other antioxidants include:

Butylatedhydroxytoluene (BHT); Tetrakis[methylene(3,5-di-tert-butyl-4-hydroxyhydrocinnamate)]methane (Irganox 1010, Ciba); 2(3H)-benzofuranone,5,7-bis-(1,1-dimethylethyl)-3-hydroxy-,reaction products with o-xylene (HP-136, Ciba), 1,3,5-trimethyl-2,4,6,-tris(3,5-di-tert-butyl-4-hydroxybenzyl) benzene (Ethanox 330, Albemarle), Octadecyl-3,5-di-tert-butyl-4-hydroxy-hydrocinnamate (Irganox 1076, Ciba), Tris-(3,5-di-tert-butyl-4-hydroxybenzyl) isocyanurate (Irganox 3114, Ciba); distearylthiodipropionate, bis(hydrogenated tallow alkyl)amines, oxidized (FS 042,Ciba); dialkyl methyl amine oxide (Genox EP, GE Specialty Chemical); tris-(3,5-di-tert-butyl-4-hydroxybenzyl) isocyanurate (Irganox 3114, Ciba); 1,3,5-tris(4-tert-butyl-3-hydroxy-2,6-dimethylbenzyl)-1,3,5-triazine-2,4,6-(1H,3H,5H)-trione (Cyanox 1790, Cytec Industries Inc.).

Representative examples of uv stabilizers include:

Poly((6-((1,1,3,3-tetramethylbutyl)amino-S-triazine-2,4-diyl)((2,2,6,6-tetramethyl-4-piperdinyl)imino)hexamethylene((2,2,6,6-tetramethyl-4-piperidinyl)imino) (Chimassorb 944, Ciba); Polymer of dimethylsuccinate and tetramethyl hydroxy-1-hydroxyethyl piperidine (Tinuvin 622, Ciba).

Other additives include anti-stats such as glycerol monostearate and anti-block agents such as silica.

Fillers such as silica, glass fibers, talc, and the like, nucleating agents, and colorants also may be added to the polymer compositions as known by the art.

This invention typically uses propylene polymers. Propylene polymers are produced by polymerizing a feed of propylene, which may contain up to about 10–20 wt. % of ethylene or other alpha-olefin such as butene-1, pentene-1, 4-methylpentene-1, or hexene-1, or mixtures thereof. Preferably, highly crystalline propylene polymers are prepared by contacting propylene with a suitable catalyst system under polymerization conditions. Such conditions include polymerization or copolymerization temperature and time, pressure(s) of the monomer(s), avoidance of contamination of catalyst, choice of polymerization or copolymerization medium in slurry processes, the use of additives to control homopolymer or copolymer molecular weights, and other conditions well known to persons skilled in the art.

Typically, a catalyst or catalyst component is used in amounts ranging from about 0.2 to 0.01 (preferably 0.1 to 0.02) milligrams of catalyst to gram of polymer or copolymer produced.

Irrespective of the polymerization or copolymerization process employed, polymerization or copolymerization should be carried out at temperatures sufficiently high to ensure reasonable polymerization or copolymerization rates and avoid unduly long reactor residence times, but not so high as to result in the production of unreasonably high levels of stereorandom products due to excessively rapid polymerization or copolymerization rates. Generally, temperatures range from about 0° to about 120° C. with a range of from about 20° C. to about 95° C. being preferred from the standpoint of attaining good catalyst performance and high production rates. More preferably, polymerization according to this invention is carried out at temperatures ranging from about 50° C. to about 80° C.

Alpha-olefin polymerization or copolymerization according to this invention is carried out at monomer pressures of about atmospheric or above. Generally, monomer pressures range from about 20 to about 600 psi (140 to 4100 kPa), although in vapor phase polymerizations or copolymerizations, monomer pressures should not be below the vapor pressure at the polymerization or copolymerization temperature of the alpha-olefin to be polymerized or copolymerized.

The polymerization or copolymerization time will generally range from about ½ to several hours in batch processes with corresponding average residence times in continuous processes. Polymerization or copolymerization times ranging from about 1 to about 4 hours are typical in autoclave-type reactions. In slurry processes, the polymerization or copolymerization time can be regulated as desired. Polymerization or copolymerization times ranging from about ½ to several hours are generally sufficient in continuous slurry processes.

Use of solid, transition metal-based, high activity, olefin polymerization catalyst components is preferable in the reactor system described in this invention and is well known in the art including such solid components supported on a metal oxide, halide or other salt such as widely-described magnesium-containing, titanium halide-based catalyst components. Numerous supported, magnesium-containing, titanium-containing, electron donor containing olefin polymerization or copolymerization catalysts have been disclosed. For example, Arzoumanidis et al., U.S. Pat. No. 4,866,022, incorporated by reference herein, discloses a method for forming an advantageous alpha-olefin polymerization or copolymerization catalyst or catalyst component useful in this invention. In addition to the solid, magnesium containing, titanium containing catalyst component, the polymerization catalyst system used to produce propylene polymers uses an aluminum alkyl component, such as triethylaluminum, and typically an external modifier component such as a silane compound as described in U.S. Pat. No. 4,829,038, incorporated by reference herein.

Preferred catalysts and cocatalysts are high yield catalysts. "High yield" means that the residues of catalysts and cocatalysts do not have to be removed from the polymer products in a separate "deashing" process. Yields of such catalyst typically exceed 5000 grams of polymer per gram of catalyst and preferably exceed 15,000 grams of polymer per gram of catalyst.

Examples of gas-phase polymerization or copolymerization processes in which such catalyst or catalyst component is useful are described in U.S. Pat. Nos. 3,957,448; 3,965,083; 3,971,786; 3,970,611; 4,129,701; 4,101,289; 3,652,527; 4,003,712; 4,326,048; 4,337,069; 4,535,134; 4,569,809, 4,610,574; 4,640,963; 4,708,787; 5,209,607; and 5,504,166, all incorporated by reference herein. Typical gas-phase olefin polymerization or copolymerization reactor systems comprise at least one reactor vessel to which olefin monomer and catalyst components can be added and which contain an agitated bed of forming polymer particles. Typically, catalyst components are added together or separately through one or more valve-controlled ports in the single or first reactor vessel. Olefin monomer, typically, is provided to the reactor through a recycle gas system in which unreacted monomer removed as off-gas and fresh feed monomer are mixed and injected into the reactor vessel. A quench liquid, which can be liquid monomer, can be added to polymerizing or copolymerizing olefin through the recycle gas system in order to control temperature.

For typical production of impact copolymers, homopolymer formed from the first monomer in the first reactor is reacted with the second monomer in the second reactor. For manufacture of propylene/ethylene impact copolymer in a gas-phase process, propylene is polymerized in a first reactor; reactive polymer transferred to a second reactor in which ethylene is added. The result is an intimate mixture of a isotactic polypropylene chains with chains of a random propylene/ethylene copolymer. A random copolymer typically is produced in a single reactor in which a minor amount of a comonomer (typically ethylene) is added a polymerizing chains of propylene or other monomer.

Irrespective of polymerization or copolymerization technique, polymerization or copolymerization is carried out under conditions that exclude oxygen, water, and other materials that act as catalyst poisons. Also, polymerization or copolymerization can be carried out in the presence of additives to control polymer or copolymer molecular weights. Hydrogen is typically employed for this purpose in a manner well known to persons of skill in the art. Although not usually required, upon completion of polymerization or copolymerization, or when it is desired to terminate polymerization or copolymerization or at least temporarily deactivate the catalyst or catalyst component of this invention, the catalyst can be contacted with water, alcohols, acetone, or other suitable catalyst deactivators a manner known to persons of skill in the art.

The products typically useful in this invention are normally solid, predominantly isotactic polyalpha-olefins. Homopolymer or copolymer yields are sufficiently high relative to the amount of catalyst employed so that useful products can be obtained without separation of catalyst residues. Further, levels of stereorandom by-products are sufficiently low so that useful products can be obtained without separation thereof. Typically, useful propylene homopolymers show polypropylene crystallinity and have isotactic indices above 90 and many times above 95. Copolymers typically will have lower isotactic indices, typically above 80–85. The polymeric or copolymeric products produced in the presence of a catalyst can be fabricated into useful articles by extrusion, injection molding, and other common methods.

This invention is illustrated, but not limited by the following experimental runs.

EXAMPLES

A series of polypropylene resin formulations were prepared using a 2 MFR propylene homopolymer powder as a base in which additives were melt blended in an extruder and extruded without a screen pack. A standard additive package was 800 ppm Irgofos 168 (a secondary phosphite anti-oxidant), 50 ppm Cyanox 1790 (a primary anti-oxidant), 700–850 ppm Triganox 101 (peroxide), and an acid scavenger. All samples contained a sufficient amount of acid scavenger to inhibit corrosivity. Screen pack plugging (SPP) data were acquired and presented as pressure rise (psi) as a function of time.

The controlled rheology of the base resin powders was done at 230° C. The initial compounding with controlled rheolgy and pelletization of powder samples were performed using a 2.5 inch Prodex extruder with a double-stage screw having a 24:1 L/D ratio. The screw configuration contained mixing pins at the beginning and the end of the compression region, and these pins were the primary source of melt mixing (low to mid shear). The Prodex extrusion profile was 420° F., 430° F., 440° F., 440° F., 440° F., 440° F. and 440° F. for the heated zones 1 through 7 respectively. The throughput rate was approximately 120 lb./hr.

SPP testing of polypropylene resin formulations containing various acid scavengers and additives were performed by GE Specialty Chemicals. A polypropylene formulation was extruded on a ¾-inch extruder through a screen pack comprising 20/100/1400×125/100/20 mesh screens. Material was extruded for 2 hours at 10 rpm to simulate start up conditions followed by extrusion for 4 hours at 30 rpm. Pressure readings were taken by means of a pressure transducer and a data logger which takes three readings per second. Graphical outputs obtained were compared for different formulations. From these outputs, SPP ratio was calculated as: (Pmax−Pmin)/(Tmax−Tmin), where Pmax=Maximum pressure reached
Pmin=Minimum pressure reached
Tmax=Time reading at maximum pressure
Tmin=Time reading at minimum pressure.

A low SPP ratio indicates a less steep pressure rise graph over time which means a lower pressure increase. In a commercial unit, when the screen pack pressure rises to a set point, the screen pack must be changed, which requires interrupting flow of molten polymer through the extruder and causes lost production.

The procedure is published in "A New Class of Processing Stabilizers for Polypropylene," Henry Ashton, GE Specialty Chemicals, in Proceedings of the International Conference on Polyolefins, Polyolefins XI, Page 465 (1999).

Data showing the effect on screen pack plugging are presented in Table 1 in Examples 1 and 2 and Comparative Runs A–E.

TABLE 1

|  | 1 | A | B | C | D | 2 | E |
|---|---|---|---|---|---|---|---|
| Calcium Lactate (ppm) |  | 200 |  | 160 |  |  |  |
| Calcium Stearate (ppm) |  |  |  |  | 200 |  |  |
| Potassium Citrate (ppm) | 200 |  |  |  |  | 250 |  |
| Sodium Lactate (ppm) |  |  |  |  |  |  | 200 |
| ZHT-4A (ppm) |  |  | 200 |  |  |  |  |
| MFR (g/10 min.) | 52.4 | 50.9 | 45.2 | 34.5 | 33.4 | 31.9 | 33.3 |
| SPP Ratio (psi/hour) | 17.7 | 33.9 | 23.6 | 137.7 | 117.0 | 18.1 | 55.6 |

Potassium citrate in Table 1 is monopotassium citrate and ZHT-4A is a magnesium aluminum hydroxide carbonate hydrate (hydrotalcite) sold by Kyowa Chemical Company.

From the data presented in Table 1, it is observed that the formulation containing potassium citrate has the least screen pack plugging ratio.

Another series of formulations were prepared similar to those described above using a base polypropylene powder resin with an MFR of 1–2 which was extruded without a screen pack with an additive and treated with 800 ppm of peroxide (Trigonox 101) for controlled rheology (Run M used 730 ppm peroxide). The polymers were tested for smoke generation and screen pack plugging as described above.

In the smoke test, a polypropylene formulation was extruded on a one-inch extruder at 100 rpm through a round die orifice at a polymer melt temperature of 435° F. A vacuum pump draws a constant volume of air from the proximity of the extruder die which is located in an enclosed chamber. This air stream containing smoke particulates passed through an aerosol meter that measures the averaged smoke particulate density every 5 seconds and the smoke results were displayed as $mg/m^3$. These results were plotted on a chart recorder and final smoke result was determined from an average of values between 5 to 15 minutes from the start of the test.

The results are shown in Table 2.

TABLE 2

| Example (Run) | Acid Scavenger (ppm)[1] | Antioxidant (ppm)[2] | UV Stabilizer (ppm)[3] | MFR (g/10 min) | Smoke (mg/m$^3$) | Yellowness Index[4] | SPP Ratio (psi/hr) |
|---|---|---|---|---|---|---|---|
| 2 | KC (250) | U626 (800) | FS410 (800) | 33 | 3.1 | −0.47 | 43 |
| (G) | CaL (160) | U626 (800) | FS410 (800) | 34 | 2.5 | 0.79 | 47 |
| (H) | NaL (250) | U626 (800) | FS410 (800) | 34 | 3.4 | 0.79 | 61 |
| 3 | KC (250) | D9228 (800) | FS410 (800) | 34 | 4.5 | −0.88 | — |
| (J) | CaL (160) | D9228 (800) | FS410 (800) | 33 | 4.1 | −1.00 | — |
| (K) | NaL (250) | D9228 (800) | FS410 (800) | 35 | 5.8 | 1.30 | — |
| (L) | NaL (250) | D9228 (500) | FS410 (800) | 34 | 5.0 | 0.76 | — |
| (M) | NaL (250) | D9228 (500) | FS410 (800) | 37 | 6.5 | 2.71 | — |
| 4 | KC (250) | PEP36 (800) | FS410 (800) | 32 | 1.6 | −0.58 | 19 |
| (N) | CaL (160) | PEP36 (800) | FS410 (800) | 35 | 2.3 | −1.13 | 58 |
| (O) | NaL (250) | PEP36 (800) | FS410 (800) | 34 | 3.0 | 1.12 | 70 |
| 5 | KC (250) | I168 (800) | FS410 (800) | 36 | 3.8 | −0.29 | — |
| 6 | KC (250) | I168/12 (800) | FS410 (800) | 34 | 1.9 | −0.48 | — |
| (P) | CaL (160) | I168 (800) | — | 40 | 8.0 | −0.55 | — |

[1]KC = potassium citrate; CaL = calcium lactate; NaL = sodium lactate
[2]U626 = Ultranox 626 (GE Specialty Chem.); PEP36 = PEP 36 (Amfine Chem.); D9228 = Doverphos S-9228 (Dover Chemical) + 1% triisopropanol amine; I168 = Irgafos 168 (Ciba); I168/12 = 50:50 Irgafos 168/Irgafos 12 (Ciba)
[3]FS410 = FS 410(Ciba) = 50:50 FS 042/Chimassorb 944 (Ciba)
[4]ASTM E313-96

What is claimed is:

1. A low smoke forming, acid neutralized propylene polymer composition comprising a propylene polymer and an effective acid-scavenging amount of from about 50 to about 1000 ppm of mono potassium citrate.

2. The polymer composition of claim 1 which contains about 100 to about 700 ppm of mono potassium citrate.

3. The polymer composition of claim 1 which contains about 200 to about 300 ppm of mono potassium citrate.

4. The polymer composition of claim 1 in which the propylene polymer is polypropylene homopolymer.

5. The polymer composition of claim 1 in which the propylene polymer is a copolymer of propylene with up to 20 wt. % ethylene or another alpha-olefin.

6. The polymer composition of claim 1 further comprising an amount of an anti-oxidant effective to inhibit the oxidation of said polymeric composition.

7. The polymer composition of claim 6 in which the anti-oxidant is selected from the group comprising phosphite, phenolic, hydroxylamine, phenolic, and benzofuranone anti-oxidants.

8. The polymer composition of claim 6 comprising an amount of at least one phosphite anti-oxidant effective to inhibit the oxidation of said polymeric composition.

9. The polymer composition of claim 6 further comprising an amount of at least one uv stabilizer effective to inhibit ultraviolet degradation of said polymeric composition.

10. The polymer composition of claim 6 comprising an amount of a uv stabilizer effective to inhibit ultraviolet degradation of said polymeric composition and an amount of an hydroxylamine or amine oxide secondary antioxidant effective to inhibit oxidation of said polymeric composition.

11. The polymer composition of claim 1 which has been modified by controlled rheology by addition of peroxide.

12. The polymer composition of claim 3 which has been modified by controlled rheology by addition of peroxide.

13. The polymer composition of claim 10 which has been modified by controlled rheology by addition of peroxide.

14. A low smoke forming, acid neutralized polypropylene composition comprising a polypropylene and about 100 to about 700 ppm of mono potassium citrate.

15. The polypropylene composition of claim 14 in which further comprises about 50 to about 2000 ppm of at least one anti-oxidant selected from the group consiting of phosphite, phenolic, hydroxylamine, phenolic, and benzofuranone anti-oxidants.

16. The polypropylene composition of claim 15 in which comprises about 25 to about 100 ppm of a phenolic primary anti-oxidant and about 400 to about 1000 ppm of a phosphite anti-oxidant.

17. The polypropylene composition of claim 16 in which further comprises about 100 to about 1000 ppm of a hydroxylamine anti-oxidant and about 100 to 1000 ppm of a uv light stabilizer.

18. A spun-bonded fabric made from the polymer composition of claim 1.

19. A thermoformed article made from the polymer composition of claim 1.

* * * * *